United States Patent
Sallam

(10) Patent No.: US 7,441,042 B1
(45) Date of Patent: Oct. 21, 2008

(54) SYSTEM AND METHOD FOR CORRELATING NETWORK TRAFFIC AND CORRESPONDING FILE INPUT/OUTPUT TRAFFIC

(75) Inventor: Ahmed Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 780 days.

(21) Appl. No.: 10/927,295

(22) Filed: Aug. 25, 2004

(51) Int. Cl.
*G06F 15/16* (2006.01)

(52) U.S. Cl. ............... 709/232; 709/216; 709/219; 707/10

(58) Field of Classification Search ............... 709/203, 709/217, 219, 224, 216, 232; 707/10; 719/319, 719/321
See application file for complete search history.

(56) References Cited

U.S. PATENT DOCUMENTS

| | | |
|---|---|---|
| 5,440,723 A | 8/1995 | Arnold et al. |
| 5,452,442 A | 9/1995 | Kephart |
| 5,473,769 A | 12/1995 | Cozza |
| 5,572,590 A | 11/1996 | Chess |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,778,384 A * | 7/1998 | Provino et al. ............ 707/200 |
| 5,812,763 A | 9/1998 | Teng |
| 5,889,943 A | 3/1999 | Ji et al. |
| 5,951,698 A | 9/1999 | Chen et al. |
| 5,956,481 A | 9/1999 | Walsh et al. |
| 5,960,170 A | 9/1999 | Chen et al. |
| 5,978,917 A | 11/1999 | Chi |
| 5,987,610 A | 11/1999 | Franczek et al. |
| 6,052,709 A | 4/2000 | Paul et al. |
| 6,070,244 A | 5/2000 | Orchier et al. |
| 6,072,830 A | 6/2000 | Proctor et al. |
| 6,088,803 A | 7/2000 | Tso et al. |
| 6,094,731 A | 7/2000 | Waldin et al. |

(Continued)

FOREIGN PATENT DOCUMENTS

DE 100 21 686 A1 11/2001

(Continued)

OTHER PUBLICATIONS

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

(Continued)

*Primary Examiner*—Oanh Duong
(74) *Attorney, Agent, or Firm*—Fenwick & West LLP

(57) ABSTRACT

A correlation manager correlates network traffic with corresponding file input/output activity. In some embodiments, a correlation manager filters both remote network traffic received by a kernel level fileserver and file input/output operations executed by the kernel level fileserver. The correlation manager correlates a thread requesting performance of a file input/output operation with a worker thread that performs the requested file input/output operation, and is thus able to correlate the remote request to perform the file input/output operation with the resulting performed file input/output operation itself. In some embodiments, the correlation manager correlates a transport driver interface thread requesting a file input/output operation with its corresponding system worker thread that implements the requested file input/output operation.

24 Claims, 2 Drawing Sheets

U.S. PATENT DOCUMENTS

| | | |
|---|---|---|
| 6,104,872 A | 8/2000 | Kubota et al. |
| 6,108,799 A | 8/2000 | Boulay et al. |
| 6,167,434 A | 12/2000 | Pang |
| 6,192,379 B1 | 2/2001 | Bekenn |
| 6,199,181 B1 | 3/2001 | Rechef et al. |
| 6,275,938 B1 | 8/2001 | Bond et al. |
| 6,338,141 B1 | 1/2002 | Wells |
| 6,357,008 B1 | 3/2002 | Nachenberg |
| 6,370,648 B1 | 4/2002 | Diep |
| 6,493,007 B1 | 12/2002 | Pang |
| 6,516,344 B1 * | 2/2003 | Nazari .................. 709/217 |
| 6,535,891 B1 | 3/2003 | Fisher et al. |
| 6,552,814 B2 | 4/2003 | Okimoto et al. |
| 6,611,925 B1 | 8/2003 | Spear |
| 6,622,150 B1 | 9/2003 | Kouznetsov et al. |
| 6,678,734 B1 | 1/2004 | Haatainen et al. |
| 6,697,950 B1 | 2/2004 | Ko |
| 6,721,721 B1 | 4/2004 | Bates et al. |
| 6,748,534 B1 | 6/2004 | Gryaznov et al. |
| 6,763,462 B1 | 7/2004 | Marsh |
| 6,813,712 B1 | 11/2004 | Luke |
| 6,851,057 B1 | 2/2005 | Nachenberg |
| 6,910,134 B1 | 6/2005 | Maher et al. |
| 6,957,219 B1 * | 10/2005 | Lin et al. .................. 707/10 |
| 7,171,464 B1 * | 1/2007 | Raghuraman et al. ....... 709/224 |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2003/0023865 A1 | 1/2003 | Cowie et al. |
| 2003/0051026 A1 | 3/2003 | Carter et al. |
| 2003/0065926 A1 | 4/2003 | Schultz et al. |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0140049 A1 | 7/2003 | Radatti |
| 2003/0191966 A1 | 10/2003 | Gleichauf |
| 2003/0212902 A1 | 11/2003 | van der Made |
| 2003/0236995 A1 | 12/2003 | Fretwell, Jr. |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2004/0162808 A1 | 8/2004 | Margolus et al. |
| 2004/0181687 A1 | 9/2004 | Nachenberg et al. |
| 2004/0261081 A1 * | 12/2004 | Sen .................. 719/313 |
| 2005/0021740 A1 | 1/2005 | Bar et al. |
| 2005/0044353 A1 * | 2/2005 | Pudipeddi et al. .......... 713/155 |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2005/0289354 A1 * | 12/2005 | Borthakur et al. .......... 713/182 |
| 2006/0064755 A1 | 3/2006 | Azadet et al. |

FOREIGN PATENT DOCUMENTS

| | | |
|---|---|---|
| EP | 1 280 039 A | 1/2003 |
| GB | 2 364 142 A | 1/2002 |
| GB | 2439451 A * | 12/2007 |
| WO | WO 97/39399 A | 10/1997 |
| WO | WO 01/91403 A | 11/2001 |
| WO | WO 02/05072 A | 1/2002 |

OTHER PUBLICATIONS

Toth, et al. "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/new/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

\* cited by examiner

SYSTEM AND METHOD FOR CORRELATING NETWORK TRAFFIC AND CORRESPONDING FILE INPUT/OUTPUT TRAFFIC

TECHNICAL FIELD

This invention pertains generally to computer operating system internals, and more specifically to correlating network traffic with it corresponding file input/output activity.

RELATED APPLICATION

This patent application is related to U.S. patent application Ser. No. 10/902,229, filed on Jul. 28, 2004, titled "Lightweight Hooking Mechanism for Kernel Level Operations," and having the same assignee (the Lightweight Hooking Mechanism application). The Lightweight Hooking Mechanism application is hereby incorporated by reference in its entirety.

BACKGROUND

In Microsoft Windows NT®, remote clients can read and write to files across the network. The LanManager redirector (RDR) implements the client side of the protocol for such activity by converting NT file system requests into SMB protocol (recently renamed CIFS by Microsoft) requests. These requests are then sent to the particular LanManager fileserver for processing. Microsoft's srv.sys is a kernel level operating system component that implements the server side of this interface. As such, srv.sys is not a file system, but rather a fileserver. A system running srv.sys can allow remote users to access any local file system data stored on that particular system.

Srv.sys comprises a network based interface and a file system based interface. The network based interface comprises the transport driver interface (TDI) layer and the network protocol drivers (e.g., a TCP/IP driver, a TCP/IPv6 driver or a NetBIOS over TCP/IP driver). Srv.sys communicates with remote computers through the network based interface.

The file system based interface is the corresponding interface with the local file system drivers that process the remote file I/O requests. Srv.sys communicates with local file system drivers such as ntfs.sys (the NT file system driver), msfs.sys (the mail slots file system driver) and npfs.sys (the named pipes files system driver) through the file system based interface.

Typically, srv.sys receives remote file I/O requests through the TDI interface, and then serves those requests through the file system interface. For example, in response to receiving a remote SMB request to create a file on an NTFS shared folder, srv.sys would issue a new IRP_MJ_CREATE request, and send it to the NT file system driver.

Correlating srv.sys network traffic with the corresponding file system traffic would enable many beneficial opportunities. For example, such correlation would allow identification of the remote computer and user issuing a remote file I/O request. This applies to all kinds of remote file I/O requests: write file to the local machine, read file from the local machine, query information of a file on the local machine, set information of a local file, query the security information of a local file, set the security information of a local file, etc.

There are three primary technical reasons why such correlation has not been achieved previously. The first reason is that all of the in-kernel interceptors of file I/O operations have been developed as either a file system filter driver or as an API interceptor for the kernel system services dispatch table functions, such as ZwCreateFile, ZwReadFile, ZwWriteFile, etc. Both techniques exist at the destination side of the file I/O request, and due to the in-kernel threading model (which includes native kernel threads, system worker threads and user mode threads), there is no readily discernable way to identify the remote requestor of the file system operation.

The second reason concerns the way in which srv.sys itself works. In order to save CPU cycles, srv.sys utilizes a concept of reusable interrupt request packets (IRPs). As such, srv.sys does not call the ZwXXXFile family of functions to request file I/O operations. Rather, srv.sys allocates IRPs by calling IoAllocateIrp and IoInitializeIrp, and then reuses those IRPs without using the standard I/O manager services to create separate IRP structures for every file I/O request. Therefore, a kernel dispatch routines interceptor would miss those srv.sys file I/O requests.

The third reason is that most of the operations performed by high level device drivers inside the Windows NT kernel are not executed during the time the request is initiated within the original thread context. Instead, they are performed later by system worker threads. Thus, when srv.sys receives an SMB network request, srv.sys will queue a work item. The queued work item's context field will provide enough information to the callback function to implement the requested file I/O operations. The worker items are de-queued and executed within the context of an arbitrary system worker thread. Therefore, it is not readily feasible to know the network information associated with that specific SMB request since the thread context is already lost. This case is very common, since srv.sys is by definition a stateless network file sharing server, and as such is not required to maintain and manage any kind of state based information.

What is needed are methods, systems and computer readable media for correlating srv.sys network traffic with its corresponding file system activity.

SUMMARY OF INVENTION

The present invention comprises methods, systems and computer readable media for correlating network traffic with corresponding file input/output activity. In some embodiments, a correlation manager filters both remote network traffic received by a kernel level fileserver and file input/output operations executed by the kernel level fileserver. The correlation manager correlates a thread requesting performance of a file input/output operation with a worker thread that performs the requested file input/output operation, and is thus able to correlate the remote request to perform the file input/output operation with the resulting performed file input/output operation itself. In some embodiments, the correlation manager correlates a transport driver interface thread requesting a file input/output operation with its corresponding system worker thread that implements the requested file input/output operation. In some embodiments, the correlation manager executes such a correlation by intercepting system calls made by the kernel level fileserver to place work items in a system queue, each work item comprising a callback function provided by the kernel level fileserver and a context field. The correlation manager replaces queue item callback functions provided by the kernel level fileserver with proxy callback functions, and stores information concerning the transport driver interface thread that issued the request, the callback function provided by the kernel level fileserver, the context field and the proxy callback function. Responsive to the proxy callback function being called by a system worker thread, the proxy callback function locates the stored information concerning the transport driver interface thread that issued the request being addressed by the queue work item, and correlates that transport driver interface thread with the system worker thread that called the proxy callback function.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
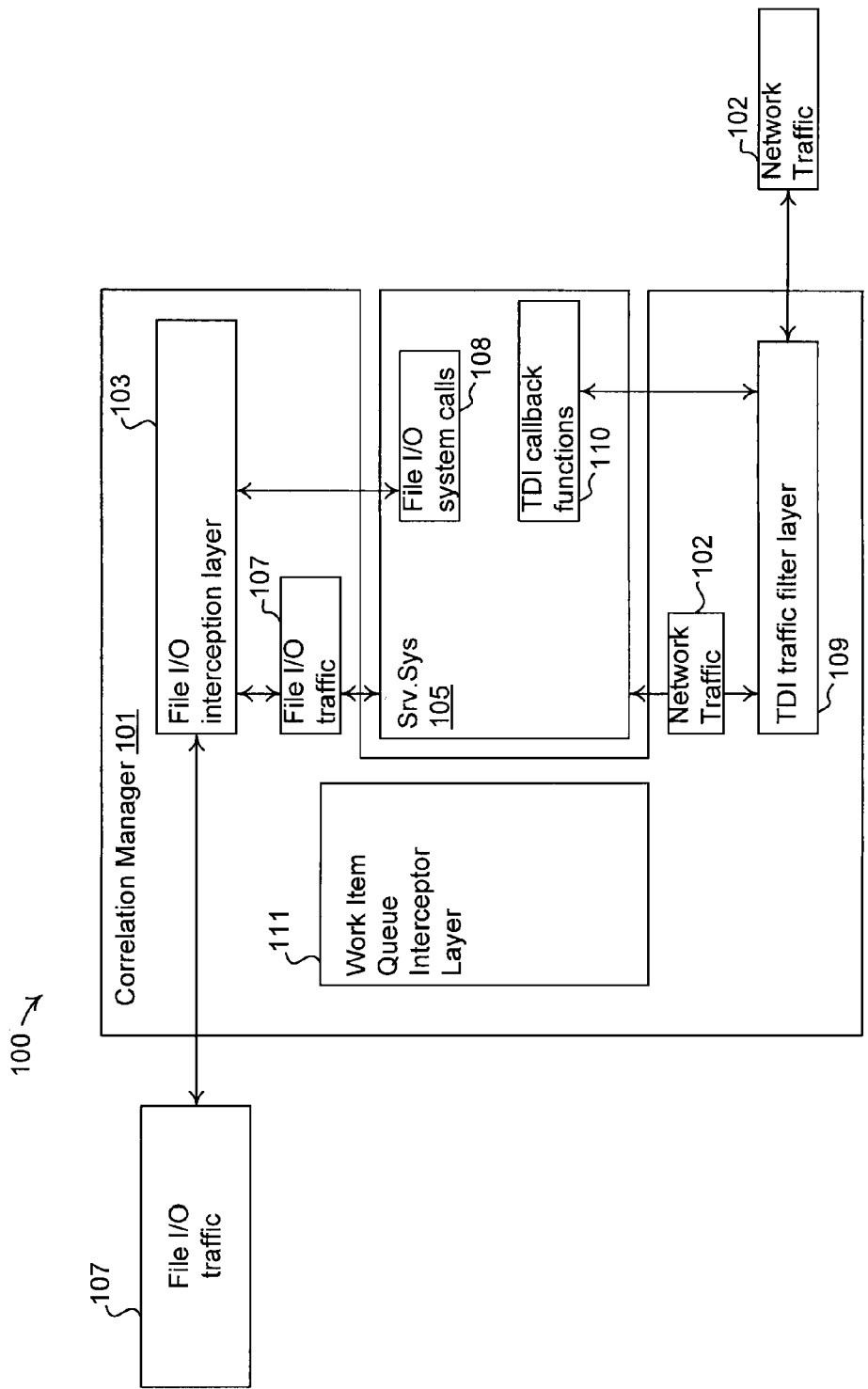
FIG. 1 is a block diagram illustrating a high level overview of a system for practicing some embodiments of the present invention

FIG. 1 illustrates a high level overview of a system 100 for performing some embodiments of the present invention. A correlation manager 101 correlates network traffic 102 with its corresponding file input/output traffic 107. It is to be understood that although the correlation manager 101 is illustrated as a single entity, as the term is used herein a correlation manager 101 refers to a collection of functionalities which can be implemented as software, hardware, firmware or any combination of the these. Where a correlation manager 101 is implemented as software, it can be implemented as a standalone program, but can also be implemented in other ways, for example as part of a larger program, as a plurality of separate programs, as one or more device drivers or as one or more statically or dynamically linked libraries.

This specification describes performing some embodiments of the present invention within the context of a current Microsoft Windows NT® configuration (including versions of Windows based on NT, such as XP, 2000 and 2003). Thus, the names of system components and system functions used herein are those of the current version of Windows NT®. Of course, the present invention is not tied to these names specifically, and in various embodiments of the present invention the described components can have other names as desired. For example, described system functions might have different names in future or different versions of Windows, all of which would be within the scope of the present invention.

In the embodiment illustrated in FIG. 1, the correlation manager 101 comprises three different hooking layers: a file I/O interception layer 103, a TDI traffic filter layer 109 and a work item queue interceptor layer 111. As illustrated in FIG. 1, the hooking layers are installed on top of srv.sys 105, such that only the traffic related to the operations of srv.sys 105 is affected.

The file I/O interception layer 103 filters srv.sys 105 requested file I/O operations 107. As described in detail below, the correlation manager 101 correlates these operations 107 with their associated remote network requests 102. The file I/O interception layer 103 is implemented according to the techniques disclosed in the Lightweight Hooking Mechanism application. The correlation manager 101 examines the file I/O services 108 imported by srv.sys 105 to determine which file I/O system calls 108 to hook.

The TDI traffic filter layer 109 hooks the TDI callback functions 110 installed by srv.sys 105, when srv.sys 105 registers those TDI network callback functions 110. In some embodiments the TDI traffic filter layer 109 also hooks calls 110 to IoCallDriver (TDI Driver, IRP_MJ_INTERNAL_CONTROL) to filter the custom TDI traffic 102. This allows the TDI traffic filter layer 109 to hook all callbacks 110 and TDI requests 102 coming from srv.sys 105. Thus, the TDI traffic filter layer 109 can filter remote network traffic 102 received by srv.sys 105. The implementation mechanics of hooking the TDI callback functions 110 installed by srv.sys 105 and calls 110 to IoCallDriver will be apparent to one of ordinary skill in the relevant art in light of this specification and the Lightweight Hooking Mechanism application.

Figure 2:
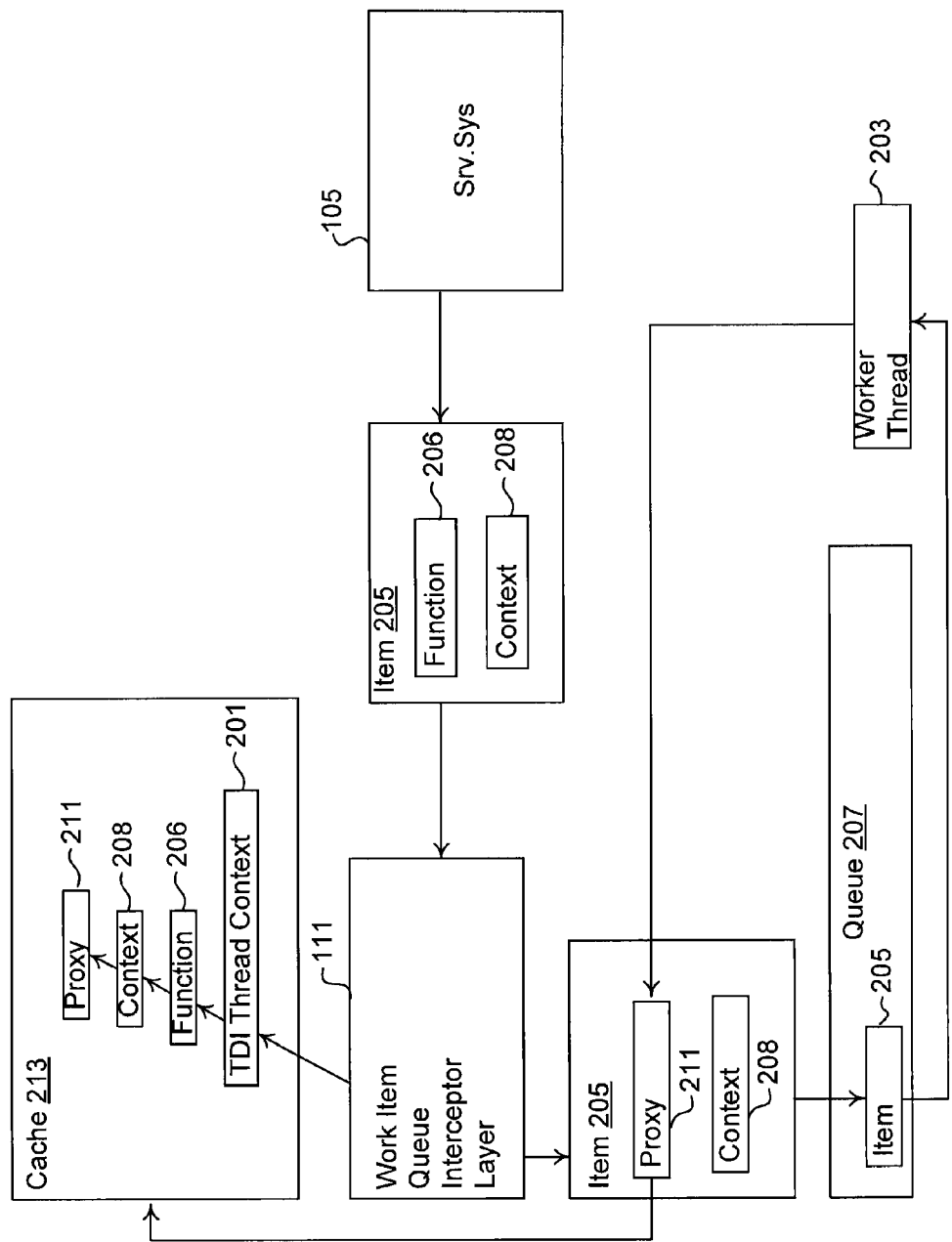
FIG. 2 is a block diagram illustrating thread correlation, according to some embodiments of the present invention.

FIG. 2 illustrates the system work item queue interceptor layer 111 according to one embodiment of the present invention. The work item queue interceptor layer 111 correlates the TDI threads 201 with their corresponding system worker threads 203 that implement the file I/O operations 107. Microsoft Windows NT® has a feature that enables device drivers to allocate a queue item 205 that is essentially a callback function 206 coupled with a context field 208, and then add this item 205 to a system work queue 207. The items 205 in the system work queue 207 are processed in first in-first out order, each item 205 being processed by a system worker thread 203 that calls its corresponding callback function 206 with the supplied context field 208. When srv.sys 105 receives a TDI request 102 to perform file input/output activity 107 (e.g., a request 102 to read a local file), srv.sys 105 uses these system services to place a queue item 205 corresponding to the TDI request 102 in the queue 207, to be processed by a system worker thread 203. Srv.sys 105 provides a callback function 206 for the worker thread 203 to call, in order to perform the actual file input/output activity. The Windows I/O manager provides the following functions to enable device drivers to manage the work items: IoAllocateWorkItem, IoQueueWorkItem and IoFreeWorkItem.

In some embodiments of the present invention, the work item queue interceptor layer 111 intercepts calls made by srv.sys 105 to these functions in the I/O manager module, which is located in the Windows system kernel. Such interception can be managed according to the techniques disclosed in the Lightweight Hooking Mechanism application.

The work queue interceptor layer 111 can create a new proxy callback function 211 for every callback function 206 supplied by srv.sys 105 to queue a work item 205. By hooking IoQueueWorkItem, the work queue interceptor layer 111 can substitute its own proxy function 211 for the callback function 206 provided by srv.sys 105, whenever srv.sys 105 adds an item 205 to the queue 207. The work queue interceptor layer 111 maintains a cache 213 (or other storage mechanism) in which it stores the current TDI thread 201 context (i.e., information concerning the thread making the request 102 resulting in the queuing of the work item 205), the corresponding srv.sys 105 callback function 206, the context field 208, and the created proxy callback function 211. When a system worker thread 203 processes the queued item 205, it calls the proxy function 211. When the proxy function 211 is called by a system worker thread 203, the work queue interceptor layer 111 (via its created proxy function 211) looks in the cache 213 and locates the original supplied callback function 206, as well as the associated thread context. With this information, the correlation manager 101 can correlate the requesting TDI thread 201 with the system worker thread 203 servicing the queued item 205, and hence the local file system operation 107 with the associated network request 102. The correlation manager 101 can then call the original callback function 206 with its context field 208 to execute the file input/output activity 107. Typically, the work queue interceptor layer 111 manages the allocation and freeing of the work queue handles to manage the cache 213.

Similarly, the work queue interceptor layer 111 can track the direct creation of system worker threads 203 using the PsCreateSystemThread system function. So, if a worker thread 203 creates a child thread 215, the work queue interceptor layer 111 can create a new proxy callback function 211 for the original callback function 206 and the context supplied therewith. The work queue interceptor layer 111 can link the entries for both threads 203, 215 in the cache 215, and the correlation logic can subsequently take both threads 203, 215 and the relationship between them into account. This will enable the work queue interceptor layer 111 to locate the parent of any currently executing system worker thread 203, whether the thread was created directly by PsCreateSystemThread or whether it was queued as a work item 205.

As noted above, in some embodiments of the present invention, the work queue interceptor layer 111 replaces callback functions 206 with its own proxy functions 211. The system functions PsCreateSystemThread and IoQueueWorkItem take a context field 208 as a parameter. In some embodiments, the work queue interceptor layer 111 replaces the context field 208 with one that points directly to the corresponding cache entry 205, and then uses the supplied context field 208 when calling the original function 206. This optimization saves the time required to perform the cache lookup operation.

Note that the present invention is neutral to the operations of the file system driver and the TDI network protocol driver, as it hooks interfaces provided by the I/O manager and filters TDI traffic. These interfaces are both backward and upward compatible. Therefore, embodiments of the present invention can support any newly developed file system for Windows NT®. Embodiments can also support any newly developed network protocol drivers.

Various embodiments of the present invention have numerous benefits. For example, the present invention can act as an intelligent filter that will identify the source computer of every SMB operation. This includes defining the IP address, computer host name, user SID, etc. This kind of functionality can be very beneficial in a variety of contexts, for example for an Anti-virus product to identify computers that are infecting other computers. It would also be desirable for use in a behavior blocking component that catches worms that are quickly propagating through open network shares. Additionally, the present invention can enable development of an intelligent access control system that could control remote access to a local file system, by defining rules based on, e.g., user identity or the source computer issuing the remote file request. This feature would be beneficial during a virus outbreak, when it is essential to isolate infected machines from the network quickly. This feature would also be very important for a behavior blocking system that might decide to block certain user access to the local machine file resources based on any behavior blocking based rules.

Some examples of specific usage scenarios of some embodiments of the present invention are detailed in Table 1.

TABLE 1 srv.sys establishes TDI connections to serve a SMB request:
Through the TDI filter layer, get all the remote computer network information. Store the network information in internal cache, and associate that information with that particular thread.
srv.sys queues a work item to serve the new SMB request:
Through the work queue interceptor layer, generate a new proxy callback function. Queue the proxy callback function, the original callback function and the context field 208 to the right record in the internal cache. Call the IoQueueWorkItem function with the proxy function instead of the original function.
A system worker thread proxy function is called: Do a cache lookup in the internal cache using the proxy callback as a hash index, and locate the original cache entry which contains the original callback function, the original thread-id and the network connection information. Store the system worker queue thread-id in the located cache entry. Call the original callback function.
The original callback function serves file I/O operations:
Through the file I/O filter layer, capture the file I/O traffic and get the worker thread-id. By doing a cache lookup into the internal cache using the worker thread-id as a cache lookup key, locate the corresponding cache entry. Correlate the served file I/O operations with the original network connection information stored in the cache entry.
srv.sys calls PsCreateSystemThread to serve a file 110 request:
Create a new proxy function to replace the original specified thread callback function and its associated context. Create/modify the corresponding cache entry.
A file I/O request is issued from a
thread created by PsCreateSystemThread:
Use the proxy function and the context information to locate the previous thread cache entry. Repeat until the original main thread is found. Associate the network connection information associated with the ancestor threads with the currently performed file I/O operation. Call the original thread function.
A file I/O request is issued and a behavior blocking system is installed:
Identify the network identity of the requestor of this file I/O operation, through the different sequence of operations mentioned previously. Apply rules controlling remote access rights.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for correlating network traffic with corresponding file input/output activity, the method comprising the steps of:

intercepting system calls made by a kernel level fileserver to place work items in a system queue, a work item comprising a callback function provided by the kernel level fileserver and a context field, and the work item corresponding to a request to perform a file input/output operation;

replacing a callback function of the work item with a proxy callback function;

storing information concerning a thread that issued the request being addressed by the work item, the callback function, the context field and the proxy callback function;

responsive to the proxy callback function being called by a system worker thread for performing the requested file input/output operation associated with the work item, the proxy callback function locating the stored information concerning the thread that issued the request being addressed by the work item;

correlating the thread that issued the request with the system worker thread for performing the requested file input/output operation using the stored information; and correlating a remote request to perform the file input/output operation with the thread that issued the request being addressed by the work item.

2. The method of claim 1 wherein:

the kernel level fileserver comprises srv.sys.

3. The method of claim 1 further comprising performing at least one step from a group of steps consisting of:

hooking a transport driver interface-callback function provided by the kernel level fileserver; and hooking calls to IoCallDriver to filter custom network traffic.

4. The method of claim 1 further comprising:

examining file input/output services imported by the kernel level fileserver; and hooking those file input/output services.

5. The method of claim 1 further comprising:

calling the callback function provided by the kernel level fileserver with the context field.

6. The method of claim 1 further comprising:

intercepting system calls to create system worker threads, wherein a system worker thread is for performing a requested file input/output operation;

determining that the system worker thread is creating a child system worker thread; and correlating a requested file input/output operation performed by the parent and child system worker threads with the thread that issued the request being addressed by the work item.

7. The method of claim 6 wherein correlating a remote request to perform the file input/output operation with the thread that issued the request further comprises:

based on the correlation between the thread that issued the request and the parent and child system worker threads, correlating the remote request to perform the file input/output operation with the file input/output operation itself.

8. The method of claim 1 wherein the thread that issued the request is a transport driver interface thread.

9. A computer readable medium containing a computer program product for correlating network traffic with corresponding file input/output activity, the computer program product comprising:

program code for intercepting system calls made by a kernel level fileserver to place work items in a system queue, a work item comprising a callback function provided by the kernel level fileserver and a context field, and the work item corresponding to a request to perform a file input/output operation;

program code for replacing a callback function of the work item with a proxy callback function;

program code for storing information concerning a thread that issued the request being addressed by the work item, the callback function, the context field and the proxy callback function;

program code within the proxy callback function for responsive to the proxy callback function being called by a system worker thread for performing the requested file input/output operation associated with the work item, the proxy callback function locating the stored information concerning the thread that issued the request being addressed by the work item;

program codec for correlating the thread that issued the request with the system worker thread for performing the requested file input/output operation using the stored information; and program code for correlating a remote request to perform the file input/output operation with the thread that issued the request being addressed by the work item.

10. The computer program product of claim 9 wherein:

the kernel level fileserver comprises srv.sys.

11. The computer program product of claim 9 further comprising program code for performing at least one step from a group of steps consisting of:

hooking a transport driver interface-callback function provided by the kernel level fileserver; and hooking calls to IoCallDriver to filter custom network traffic.

12. The computer program product of claim 9 further comprising:

program code for examining file input/output services imported by the kernel level fileserver; and program code for hooking those file input/output services.

13. The computer program product of claim 9 further comprising:

program code for calling the callback function provided by the kernel level fileserver with the context field.

14. The computer program product of claim 9 further comprising:

program code for intercepting system calls to create system worker threads wherein a system worker thread is for performing a requested file input/output operation;

program code for determining that the system worker thread is creating a child system worker thread; and program code for correlating a requested file input/output operation performed by the parent and child system worker threads with the thread that issued the request being addressed by the work item.

15. The computer program product of claim 14 wherein the program code for correlating a remote request to perform the file input/output operation with the thread that issued the request further comprises:

program code for, based on the correlation between the thread that issued the request and the parent and child system worker threads, correlating the remote request to perform the file input/output operation with the file input/output operation itself.

16. The computer program product of claim 9 wherein the thread that issued the request is a transport driver interface thread.

17. A computer system having a computer-readable storage medium having computer-executable code for correlating network traffic with corresponding file input/output activity, the computer-executable code comprising:

a software portion configured to intercept system calls made by a kernel level fileserver to place work items in a system queue, a work item comprising a callback function provided by the kernel level fileserver and a context field, and the work item corresponding to a request to perform a file input/output operation;

a software portion configured to replace a callback function of the work item with a proxy callback function;

a software portion configured to store information concerning a thread that issued the request being addressed by the work item, the callback function, the context field and the proxy callback function;

a software portion within the proxy callback function configured to locate the stored information concerning the thread that issued the request being addressed by the work item, responsive to the proxy callback function being called by a system worker thread for performing the requested file input/output operation associated with the work item;

a software portion configured to correlate the thread that issued the request with the system worker thread for performing the requested file input/output operation using the stored information; and a software portion configured to correlate a remote request to perform the file input/output operation with the thread that issued the request being addressed by the work item.

18. The computer system of claim 17 wherein:
the kernel level fileserver comprises srv.sys.

19. The computer system of claim 17 further comprising a software portion configured to perform at least one step from a group of steps consisting of:

hooking a transport driver interface-callback function provided by the kernel level fileserver; and hooking calls to IoCallDriver to filter custom network traffic.

20. The computer system of claim 17 further comprising:
a software portion configured to examine file input/output services imported by the kernel level fileserver; and a software portion configured to hook those file input/output services.

21. The computer system of claim 17 further comprising:
a software portion configured to call the callback function provided by the kernel level fileserver with the context field.

22. The computer system of claim 17 further comprising:
a software portion configured to intercept system calls to create system worker threads, wherein a system worker thread is for performing a requested file input/output operation;

a software portion configured to determine that the system worker thread is creating a child system worker thread; and a software portion configured to correlate requested file input/output operation performed by the parent and child system worker threads with the thread that issued the request being addressed by the work item.

23. The computer system of claim 22 wherein the software portion configured to correlate a remote request to perform the file input/output operation with the thread that issued the request further comprises:

a software portion configured to correlate the remote request to perform the file input/output operation with the file input/output operation itself, based on the correlation between the thread that issued the request and the parent and child system worker threads.

24. The computer system of claim 17 wherein the thread that issued the request is a transport driver interface thread.

* * * * *

UNITED STATES PATENT AND TRADEMARK OFFICE
CERTIFICATE OF CORRECTION

PATENT NO.        : 7,441,042 B1
APPLICATION NO. : 10/927295
DATED             : October 21, 2008
INVENTOR(S)      : Ahmed Sallam It is certified that error appears in the above-identified patent and that said Letters Patent is hereby corrected as shown below:

Title Page item (73) Assignee:

Please delete "Symanetc" and replace with --Symantec--.

Signed and Sealed this

Tenth Day of February, 2009

JOHN DOLL
*Acting Director of the United States Patent and Trademark Office*